April 8, 1930. A. E. PEW, JR 1,753,803
LEVEL INDICATOR FOR MINERAL OIL STILLS
Filed Feb. 27, 1926

INVENTOR
Arthur E. Pew, Jr.
BY
Busser and Harding
ATTORNEYS.

WITNESS:
Rob't P. Kitchel.

Patented Apr. 8, 1930

1,753,803

UNITED STATES PATENT OFFICE

ARTHUR E. PEW, JR., OF BRYN MAWR, PENNSYLVANIA, ASSIGNOR TO SUN OIL COMPANY, OF PHILADELPHIA, PENNSYLVANIA, A CORPORATION OF PENNSYLVANIA

LEVEL INDICATOR FOR MINERAL-OIL STILLS

Original application filed June 19, 1925, Serial No. 38,184. Divided and this application filed February 27, 1926. Serial No. 91,047.

In an application filed by me June 19, 1925, Serial No. 38,184, of which this application is a division, I set forth an apparatus for the continuous distillation of oil under a high vacuum. Included in the apparatus is a series of cylindrical still tanks each of which is provided with an inlet and an outlet. Continuously admitted oil flows onto the upper end of an inclined vaporizing pan that extends within the still chamber over a body of oil in the chamber. Part of the oil that travels along the pan is vaporized. The unvaporized residue is discharged from the lower end of the vaporizing pan into said body of oil.

Continuity of the process involves continuous or intermittent withdrawal of the oil from the body of oil and its continuous feed into the next tank of the series in which, at a higher temperature, other and heavier fractions of the oil are vaporized. It follows, therefore, that the body of oil in each of the stills shall be maintained at or close to a predetermined level, and it is important that the operator should be able, at any time, by casual inspection, to ascertain that level.

The present invention comprises means that accomplish this result without danger of air leakage. They comprise a device within the tank whose position changes with the oil level, connections from said device extending through the tank wall and operable by said device, an indicator operable by said connections, and means whereby leakage of air into the tank through or around said connections is rendered impossible.

A preferred embodiment of the invention is shown in the drawings, in which—

Figure 1:
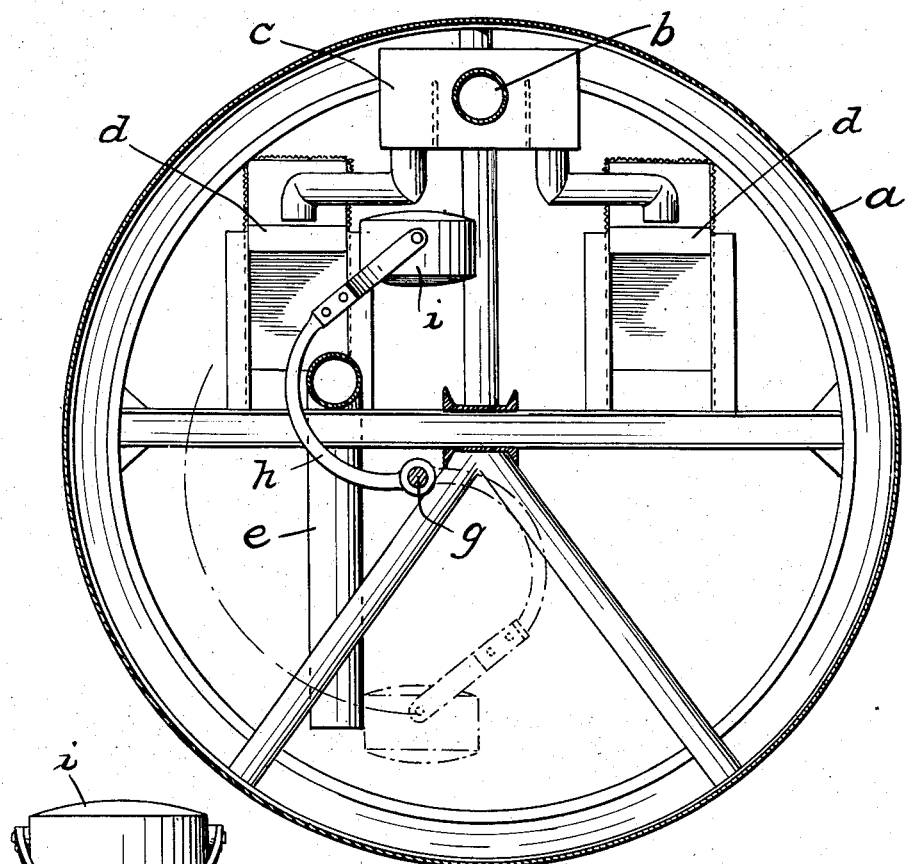
Fig. 1 is a cross-section through a tank still near one end.
Figures 2, 3:
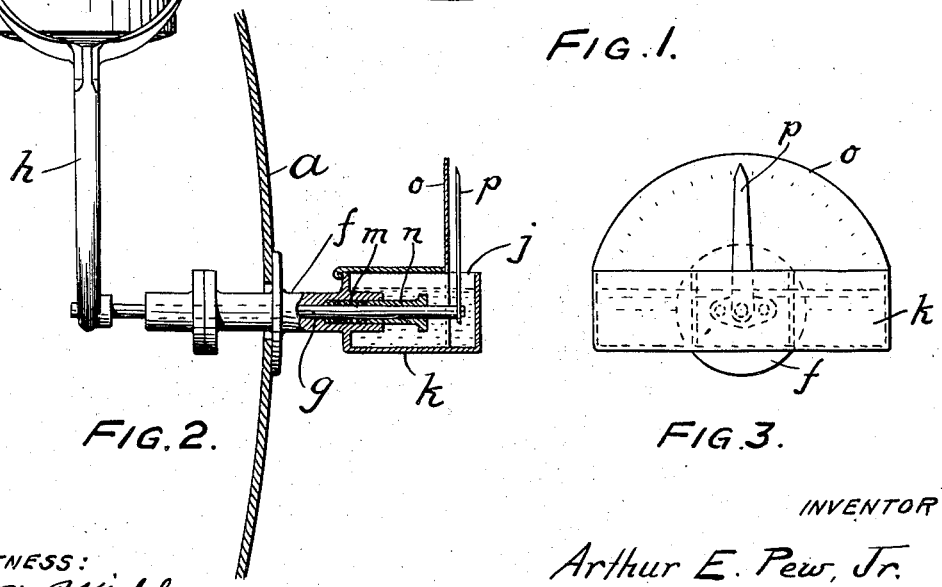
Fig. 2 is a side view, partly in section, of the oil level indicator and air seal.
Fig. 3 is an end view of that part of the oil level indicator which is outside the still.

The still tank $a$ is preferably a long cylindrical body with end heads welded thereto. Oil is admitted through a pipe $b$ to the upper part of one end of the tank and discharges onto a distributing box $c$, from which the oil is equally distributed onto two vaporizing pans $d$ which extend longitudinally, with a downward inclination, toward the other end of the tank. Lighter fractions of the oil are vaporized in the course of their flow along these pans. The unvaporized residue discharges into a body of oil in the tank, from which the oil is withdrawn by means of an outlet pipe $e$.

Extending through one of the end heads of the still is a bearing sleeve $f$ in which turns a shaft $g$ carrying an arm $h$ having a forked end on which is pivotally mounted a float $i$. Shaft $g$ extends beyond the bearing sleeve into box $k$ having an opening $j$, in its top, to the atmosphere. Between the shaft $g$ and the outer end of the bearing sleeve $f$ is packing $m$ held in place by a gland $n$.

Secured to the bottom of the box $k$ and projecting through the opening $j$ in its top is a dial $o$. Secured to the extreme end of the shaft $g$ and projecting through the opening $j$ in the top of the box $k$ is a pointer $p$. By means of the pointer $p$ and dial $o$ the level of oil in the tank is indicated.

The flow of air through the shaft bearing is prevented by filling the box $k$ with oil. There is thus interposed an oil seal between the atmosphere and the interior of the tank, rendering leakage of air into the tank impossible.

What I claim is:

1. The combination, with a vacuum still adapted to contain a pool of oil, of a device within the still movable by and in accordance with changes in the level of the oil, connecting means from said device extending through the wall of the still and movable with said device, a liquid level indicator located outside the still and operable by said connecting means, packing obstructing fluid communication with the interior of the still around said connecting means, a liquid seal container and a liquid seal therein blocking leakage of air around said connecting means through the packing, said liquid seal being exposed to the atmosphere.

2. The combination, with a still adapted to contain a pool of oil under high vacuum, of a device within the still movable by and in accordance with changes in level of the oil, a bearing sleeve carried by and extending through the still wall, connecting means from said device extending through the wall of the still and said bearing sleeve and movable with said device, packing between said bearing sleeve and connecting means and obstructing fluid communication with the interior of the still between said bearing sleeve and connecting means, a liquid seal container into which said connecting means extends, a liquid seal in said container blocking leakage of air through said container and packing into the interior of the still, and a liquid level indicator operable by said connecting means and partly contained in, and partly projecting from said container.

In testimony of which invention I have hereunto set my hand at Philadelphia, Pennsylvania, on this 19th day of February, 1926.

ARTHUR E. PEW, Jr.